United States Patent
Lounsbury et al.

(10) Patent No.: US 6,481,038 B2
(45) Date of Patent: Nov. 19, 2002

(54) SELF RELEASING HOLDDOWN MECHANISM FOR DOCK LEVELER

(75) Inventors: Mark S. Lounsbury, Wassaic, NY (US); Charles J. Torgersen, Wingdale, NY (US)

(73) Assignee: Overhead Door Corporation, Dallas, TX (US)

( * ) Notice: Subject to any disclaimer, the term of this patent is extended or adjusted under 35 U.S.C. 154(b) by 0 days.

(21) Appl. No.: 09/759,860

(22) Filed: Jan. 12, 2001

(65) Prior Publication Data

US 2002/0092101 A1 Jul. 18, 2002

(51) Int. Cl.[7] .............................................. E01D 1/00
(52) U.S. Cl. ........................................ 14/71.1; 14/69.5
(58) Field of Search ................................ 14/69.5, 71.1, 14/71.3

(56) References Cited

U.S. PATENT DOCUMENTS

| | | | |
|---|---|---|---|
| 2,974,336 A | | 3/1961 | Kelly |
| 3,117,332 A | | 1/1964 | Kelley et al. |
| 3,786,530 A | * | 1/1974 | Le Clear ..................... 14/71.3 |
| 3,835,497 A | * | 9/1974 | Smith ......................... 14/71.3 |
| 3,882,563 A | * | 5/1975 | Smith et al. .................. 14/71.3 |
| 3,982,295 A | * | 9/1976 | Burnham ..................... 14/71.3 |
| 4,126,909 A | * | 11/1978 | Smith et al. .................. 14/71.3 |
| 5,303,443 A | | 4/1994 | Alexander |
| 5,317,775 A | | 6/1994 | das Dores |
| 5,440,772 A | * | 8/1995 | Springer et al. ............. 14/69.5 |
| 5,784,740 A | | 7/1998 | DiSieno et al. |
| 6,061,859 A | | 5/2000 | Winter |

* cited by examiner

Primary Examiner—Gary S. Hartmann
(74) Attorney, Agent, or Firm—Gardere Wynne Sewell LLP

(57) ABSTRACT

A self releasing holddown mechanism for a dock leveler includes an elongated bar member adapted for connection to a dock leveler ramp and engageable with a roller lock member mounted on a body connected to an anchor rod which is connected at one end to the dock leveler frame. The anchor rod includes a release plate mounted thereon including adjustable stop members. The release plate is mounted for adjustment with respect to the rod. A coil spring is sleeved over the rod and engageable with the release plate and the body which includes an elongated tube journaling the spring. A release actuator is mounted for pivotal movement on the body and is connected to the roller lock member to move the lock member between positions for forcible engagement with the bar member and to release the bar member. The release actuator may also be operated at will.

12 Claims, 4 Drawing Sheets

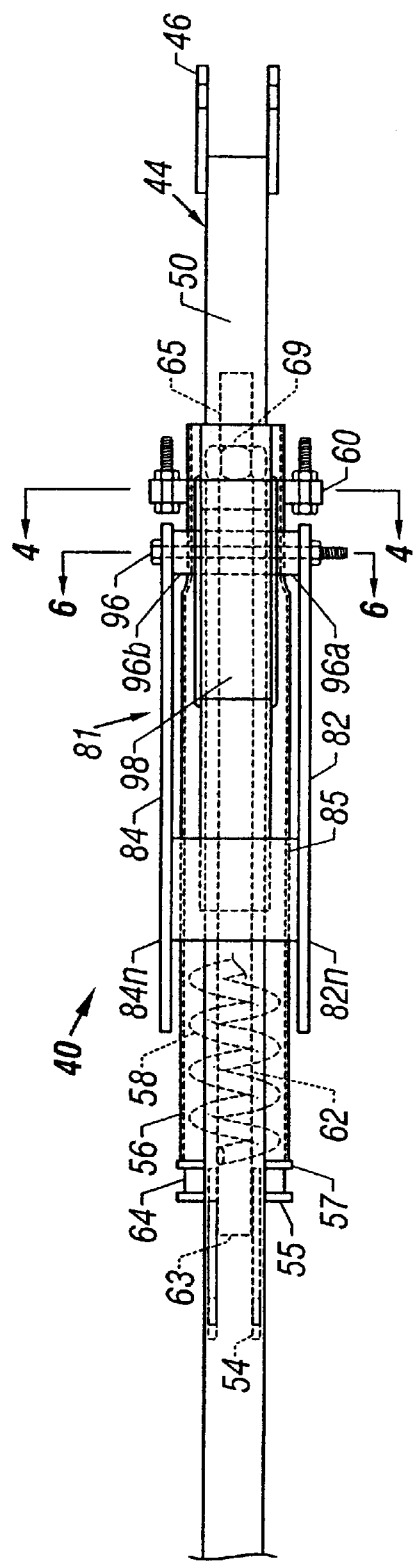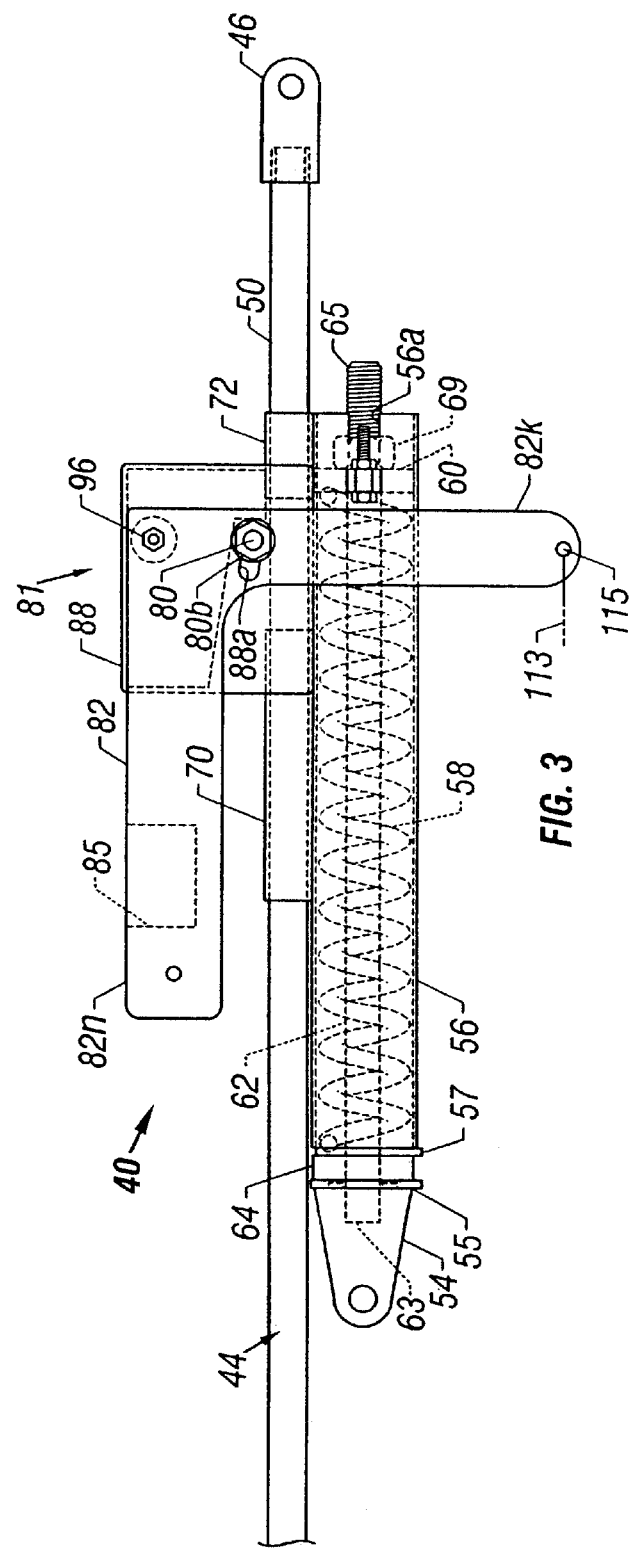

SELF RELEASING HOLDDOWN MECHANISM FOR DOCK LEVELER

FIELD OF THE INVENTION

The present invention pertains to a self releasing holddown mechanism for a self elevating dock leveler.

BACKGROUND

Dock levelers or so-called dockboards are widely used in conjunction with freight vehicle loading docks and the like to provide a continuous path between the loading dock and the loadbed of a vehicle. Dock levelers typically utilize one or more heavy duty springs or other means which operate through a linkage to bias the dock leveler ramp from a stored position to an elevated position, including the engaged or working position of the leveler with respect to a vehicle loadbed. In dock levelers of the general type mentioned above, a holddown mechanism is utilized to maintain the dock leveler in the stored position or a desired working position against pivotal movement, except within a very limited range, about the ramp pivot axis during operation or storage.

One type of holddown mechanism which enjoys certain advantages is disclosed and claimed in U.S. Pat. No. 6,061,859 to Bruce R. Winter and assigned to the assignee of the present invention. The dock leveler holddown mechanism disclosed and claimed in the aforementioned patent includes a ratchet bar and pawl mechanism together with a self-releasing feature to minimize the chance of damage to or failure of the holddown mechanism. However, it has been deemed desirable to further improve the general type of holddown mechanism disclosed and claimed in U.S. Pat. No. 6,061,859. It is to these ends that the present invention has been developed.

SUMMARY OF THE INVENTION

The present invention provides an improved holddown mechanism for a dock leveler or dockboard, particularly of the type which has a biasing mechanism tending to move the leveler ramp to an elevated position.

The present invention also provides a holddown mechanism for a dock leveler ramp which is self-releasing to minimize the risk of damage to or failure of the holddown mechanism or the ramp as a consequence of movement of a vehicle loadbed during loading and unloading operations. In a preferred embodiment of the holddown mechanism, an elongated bar is connected to the dock leveler ramp and is engaged with a roller type lock member which is operable to prevent movement of the bar and the ramp in an upward direction except over a limited ranged provided by the holddown mechanism. If movement of the ramp exceeds the range of movement provided by the holddown mechanism, the lock member releases the bar to allow the ramp to move upward and to prevent damage to the ramp and/or the holddown mechanism.

The combination of the bar and roller lock member improves the operating life and the performance of the holddown mechanism and reduces the chance of damage to the bar, the bar lock member, and other parts of the holddown mechanism as compared with holddown mechanisms which utilize a ratchet and pawl, for example. The holddown mechanism of the present invention also includes an improved arrangement of an actuator member for engaging and releasing the lock member with respect to the bar and an improved self releasing mechanism for releasing the roller lock member from forcible engagement with the bar to allow movement of the dock leveler ramp.

Those skilled in the art will further appreciate the advantages and superior features of the invention upon reading the detailed description which follows in conjunction with the drawing.

BRIEF DESCRIPTION OF THE DRAWINGS

FIG. 2 is a top plan view of the holddown mechanism shown in FIG. 1, but on a larger scale;

FIG. 3 is a side elevation of the holddown mechanism shown in FIG. 2;

DETAILED DESCRIPTION OF A PREFERRED EMBODIMENT

Figure 1:
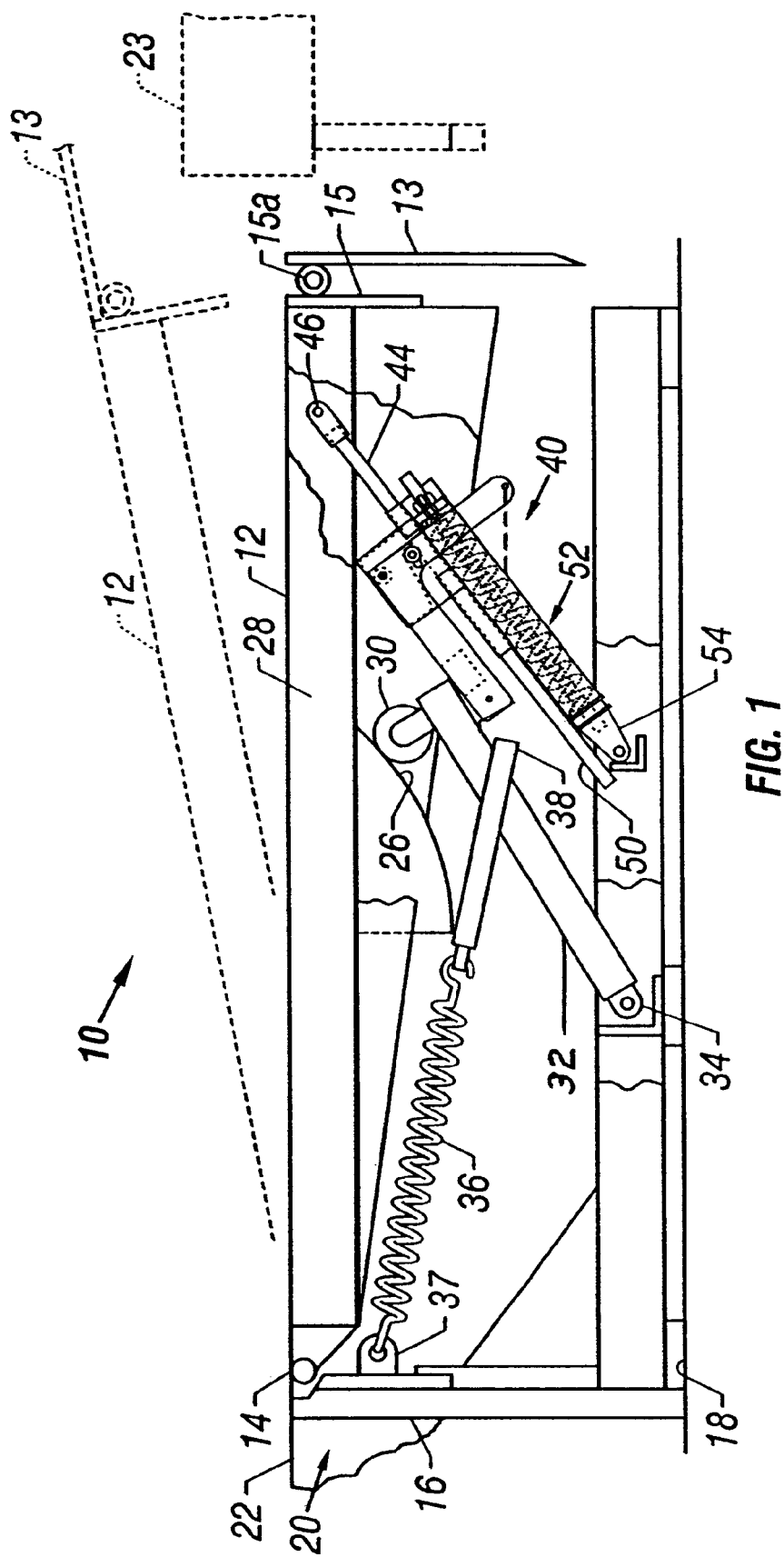
FIG. 1 is a side elevation, with parts partially broken away, of a spring biased dock leveler including the holddown mechanism of the present invention.

In the description which follows, like parts are marked throughout the specification and drawings with the same reference numerals, respectively. The drawing figures are not necessarily to scale and certain features may be shown in generalized or somewhat schematic form in the interest of clarity and conciseness.

Referring to FIG. 1, there is illustrated a dock leveler, generally designated by the numeral 10, of somewhat conventional construction except for the invention herein. The dock leveler 10 may, for example, be similar in some respects to those disclosed in U.S. Pat. No. 3,235,896, 3,835,497, and 6,061,859, being examples of somewhat conventional mechanical dock levelers of the general type to which the invention pertains. Reference may be made to the above-mentioned patents for a more detailed description of some of the conventional features of a dock leveler of the general type shown and described herein, which features are not believed to be necessary for an understanding of the present invention.

Basically, however, the dock leveler 10 includes a generally planar ramp member 12 which is connected to a hinge 14 which is also connected to a support frame 16 mounted in a suitable recess 18 of a loading dock 20. The loading dock 20 includes a generally horizontal, planar dock surface 22, which, in a stored position of the ramp 12, is substantially co-planar with the ramp. However, the ramp 12 is adapted to move about the hinge 14 to an elevated position, as indicated by the dashed lines in FIG. 1, preparatory to engagement with a loadbed 23 of a motor truck or other freight vehicle, not shown. In this regard, the ramp 12 includes an extension member or lip 13 which is pivotally connected to a distal end 15 of the ramp by suitable hinge means 15a for movement between a pendant position shown by the solid lines of FIG. 1 and an extended position shown by the dashed lines. Suitable mechanism, not shown, is operable to extend the lip 13 to the position indicated and to allow the lip to fall to its pendant position when the ramp is stored in the position shown in FIG. 1 to permit cross traffic along the dock surface 22. The ramp 12 is also operable to pivot downwardly from the stored position shown to another alternate position, depending on the height of the aforementioned vehicle loadbed.

Dock leveler 10 is, by way of example, a so-called mechanical type and includes an arcuate cam member 26 supported on a frame portion 28 of the ramp 12 and engageable with a roller 30. Roller 30 is supported on an arm 32 which is pivotally mounted on the dock leveler frame 16 at a pivot 34. One or more substantial counterbalance springs 36, one shown, operably connected to the frame 16 at 37 and at an opposite end to a link 38 suitably connected to the arm 32, exert a substantial biasing force which tends to pivot the arm 32 in a counterclockwise direction, viewing FIG. 1. Such action causes the roller 32 to roll along the member 26 to elevate the ramp 12 to the alternate position shown, as well as, depending on the weight of any object on the ramp, to a substantial number of intermediate positions. The force of the spring or springs 36 is sufficient to cause the ramp 12 to pivot in a counterclockwise direction, viewing FIG. 1, if no additional weight is acting on the ramp and, consequently, it is necessary to provide a holddown mechanism to hold the ramp in a desired position.

Referring further to FIG. 1, the aforementioned holddown mechanism of the present invention is generally designated by the numeral 40 and includes an elongated substantially rigid bar 44 pivotally connected at one end 46 to the ramp frame 28. The bar 44 is of generally rectangular cross-section and includes a generally flat upper surface 50 which is substantially continuous over a major portion of the length or longitudinal extent of the bar member, see FIGS. 2 and 3 also. The holddown mechanism 40 also includes a body, generally designated by the numeral 52, which is operably connected to the dock leveler frame 16 at a pivot connection formed in part by anchor means including a clevis 54.

Figure 7:
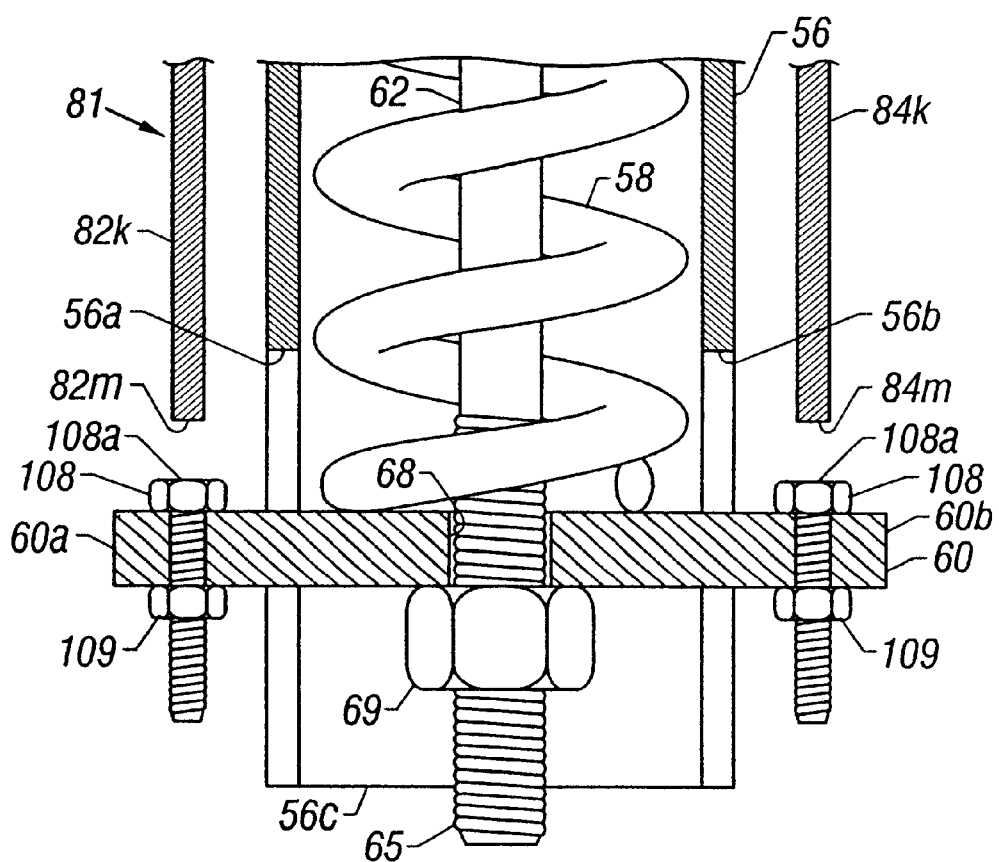
FIG. 7 is a view taken generally from the line 7—7 of FIG. 4.

Referring now to FIGS. 2 and 3, the body 52 includes an elongated cylindrical tubular part 56 in which is disposed an elongated coil spring 58. Coil spring 58 is engaged at one end with a release plate 60, see FIG. 7 also, and the opposite end of spring 58 is engaged with a transverse end wall 57 of tubular body part 56. An elongated cylindrical anchor rod 62 is disposed coaxially within tubular body part 56 and is secured at one end 63 to clevis 54. A generally annular cushion member 64 is interposed end wall 57 and a transverse base plate 55 of clevis 54. Rod 62 includes a threaded distal end 65, see FIG. 7 also, which projects through a central bore 68 in release plate 60, and on which a conventional hex nut 69 is mounted and engageable with release plate 60, as shown in FIG. 7. Hex nut 69 may be a prevailing torque type and is axially adjustable along threaded distal end 65 of rod 62. Tubular body part 56 includes opposed elongated slots 56a and 56b which open to its distal end 56c, FIG. 7. Slots 56a and 56b are adapted to accommodate opposed elongated ear portions 60a and 60b of release plate 60, see FIGS. 2 and 4 also.

Figure 4:
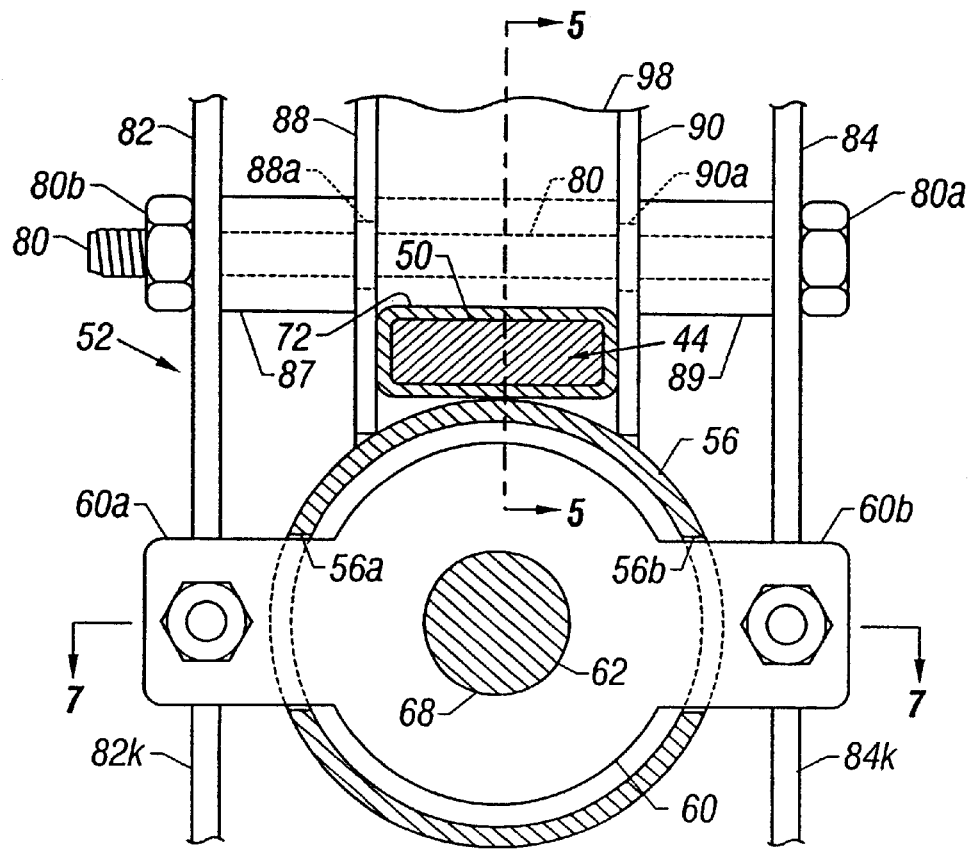
FIG. 4 is a view taken generally from the line
Figure 5:
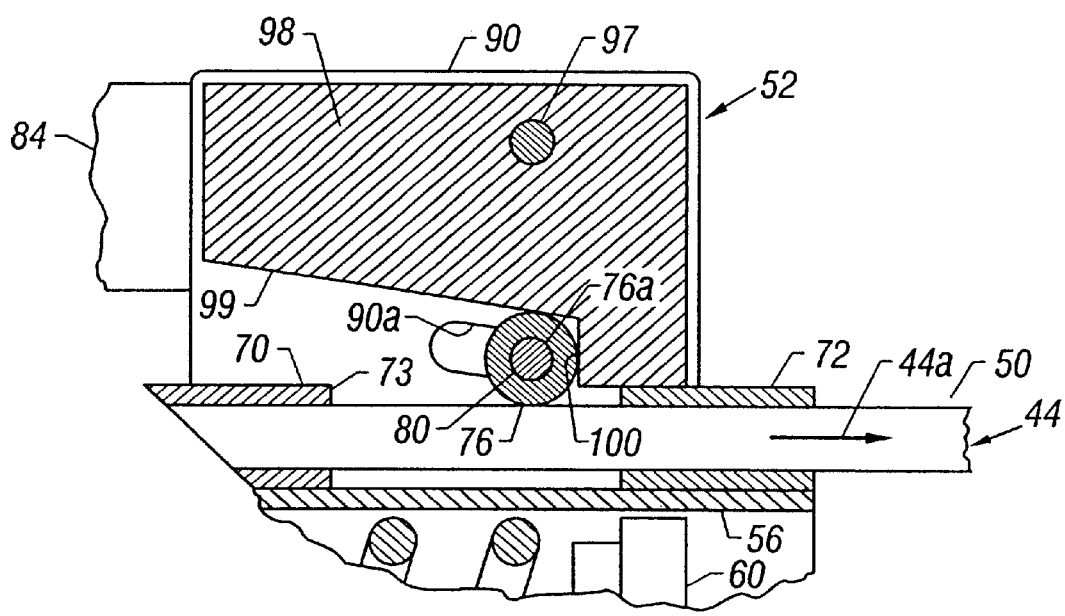
Figure 6:
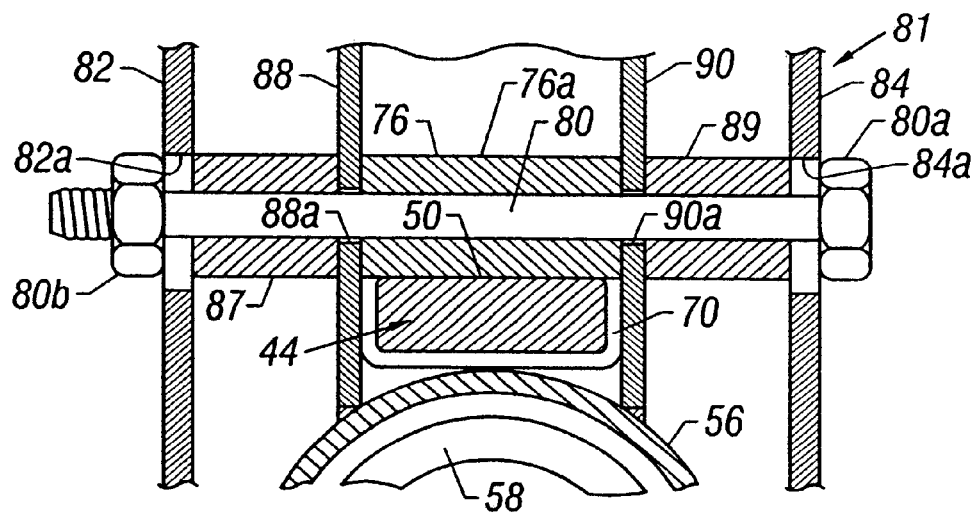
FIG. 6 is a view taken generally from the line 6—6 of FIG. 2.

Referring again to FIGS. 2 and 3, the body 52 also includes two coaxially aligned, spaced-apart generally rectangular cross section tubular parts 70 and 72 which are secured to the tubular body part 56, such as by welding, and are operable to receive and guide the bar 44 slidably therewithin, see FIGS. 4 and 6 also. Accordingly, a space 73, FIG. 5, is formed between the tubular body parts 70 and 72 for disposition of a cylindrical roller lock member 76, FIGS. 5 and 6, which is operable to forcibly engage the surface 50 of the bar 44. Roller lock member 76 is mounted on an elongated support pin 80 comprising a partially threaded machine bolt having a hex head 80a, FIG. 6. Support pin 80 is also connected to a nut 80b, as shown in FIG. 6. Support pin 80 is connected to a lock member release actuator 81 comprising spaced-apart generally platelike actuator levers 82 and 84, see FIGS. 2 and 3 also, which are provided with elongated slots 82a and 84a, respectively, FIG. 6, to allow limited relative movement between the levers 82 and 84 and the pin 80. Levers 82 and 84 are also interconnected by a generally rectangular support block 85, see FIGS. 2 and 3, to form a unitary actuator part. Roller lock member 76 is also disposed between two spaced-apart support plates 88 and 90 which are suitably secured to the body parts 70 and 72 and are disposed on opposite sides thereof, respectively.

As shown in FIG. 6, support plates 88 and 90 are also suitably secured to the tubular body part 56, such as by welding. As shown in FIGS. 5 and 6, support plates 88 and 90 have respective coextensive slots 88a and 90a formed therein through which the pin 80 projects. Slots 88a and 90a are preferably oriented at an angle of about 95° to the longitudinal extent of the slots 82a and 84a of the actuator lever parts 82 and 84 in the relative positions shown in FIG. 3. Suitable spacers 87 and 89, FIG. 6, are interposed the parts 82 and 88 and the parts 84 and 90, as shown, to provide suitable support for these parts with respect to each other. The actuator 81 formed by the lever parts 82 and 84 is also supported for pivotal movement on the body plate parts 88 and 90 by an elongated bolt and nut assembly 96, see FIGS. 2 and 3, to form a lever pivot pin 97, FIG. 5, extending between the plates 88 and 90. Suitable spacers 96a and 96b, FIG. 2, are sleeved over the pin 97 and interposed the lever parts 82 and 84 and the plates 88 and 90, respectively.

The holddown mechanism 40 further includes a cam block member 98 interposed the support plates 88 and 90, see FIGS. 4, 5 and 6, which is stationary with respect to the plates 88 and 90 and includes a sloping cam surface 99, see FIG. 5, engageable with the roller lock member 76, as shown, to bias the lock member into forcible engagement with the bar 44 when the bar tends to move in the direction of the arrow 44a, FIG. 5, relative to the lock member. The surface 99 is disposed at an angle of about 8° to 10° with respect to the surface 50 of the bar 44. A stop surface 100, FIG. 5, is formed on the block 98 and extends generally normal to the surface 50 of bar 44. However, in normal operation of the holddown mechanism, the roller lock member 76 forcibly engages the bar 44 and is wedged between the surface 99 and the surface 50 before becoming engaged with the surface 100. Thanks to the orientation of the slots 88a and 90a and surface 99, the roller lock member 76, in cooperation with the block surface 99, is urged into forcible engagement with the surface 50 of bar 44, when the bar tends to move in the direction of arrow 44a relative to the body 52, to prevent such movement. However, when bar 44 is forcibly engaged with roller lock member 76, movement of the bar in the direction of arrow 44a will also tend to move the body 52 in the same direction, compressing the spring 58. The bar surface 50 and/or the outer surface 76a of lock member 76 may be textured, if desired, such as by knurling, to improve frictional engagement between these members. However, the lock member 76 and the bar 44, preferably, do not include such structure and do not require structure which provides a positive locking engagement between these members.

As the tubular body part 56 moves to the right, viewing FIGS. 2 and 3, away from the clevis 54, the release plate 60 remains stationary with respect to the clevis 54 since it is engaged with the nut 70 on threaded end portion 65 of rod 62. As the spring 58 is compressed, the lever members 82 and 84, move with the remainder of the body 52 until they engage adjustable release stop members 108 mounted on the opposed release plate ears 60a and 60b, see FIG. 7. Depending legs 82k and 84k of the levers 82 and 84 include surfaces 82m and 84m, FIG. 7, which engage the adjustable release stop members 108. Stop members 108 preferably comprise hexhead machine bolts which are threadedly engaged with the ears 60a and 60b, respectively, and include suitable locknuts 109 threaded thereon so that the positions of bolt heads 108a of the respective stop members may be adjusted relative to the release plate 60, as desired. Accordingly, the position of the release plate 60 may be adjusted with respect to the rod 62 and the release stop members 108 may also be adjusted with respect to the release plate 60 to provide a suitable range of adjustment of the point at which the levers 82 and 84 are engaged as the spring 58 is compressed under a situation where the leveler ramp 12 is urged to pivot in a counterclockwise direction, viewing FIG. 1. This type of action typically occurs when a loadbed of a vehicle is rising with the lip 13 mounted thereon as a load is removed from the loadbed.

Referring to FIGS. 1 through 3, in normal operation, the holddown mechanism 40 is operable to allow movement of the ramp 12 in a clockwise direction about the pivot 14, FIG. 1, since the bar 44 can move relative to the body 52, at will. Such action will, for example, move the lock member 76 and its support pin 80 within the slots 88a and 90a and along the surface 99 out of forcible engagement with the surface 50 of bar 44. However, when the bar 44 moves in the direction of arrow 44a, FIG. 5, relative to the body 52, the roller lock member 76 will be urged to move along the surface 99 toward the surface 100 and will forcibly engage the bar 44 and prohibit movement of the bar relative to the body 52. As previously described, as the body 52 moves with the bar 44 when the ramp 12 is urged to move counterclockwise about hinge 14, spring 58 will be compressed until the lever members 82 and 84 engage the stop members 108a. Continued movement of the body member 52 and the actuator 81 will effect pivotal movement of the lever members 82 and 84 in a clockwise direction, viewing FIG. 3, about the pivot pin 97. This action will force roller lock member 76 to move within slots 88a and 90a, and along surface 99 out of engagement with surface 50 of bar 44, thus allowing the bar 44 to move relative to the body 52 and with the ramp 12 to prevent damage to the holddown mechanism 40 and/or the ramp and lip 13. The amount of compression of spring 58 required to effect release of the holddown mechanism may be adjusted by adjusting the position of the nut 69 and the release plate 60. Fine adjustment of the operation of the self releasing holddown mechanism 40 may also be accomplished by adjusting the positions of the stop members 108 with respect to the release plate 60.

Another advantage of the holddown mechanism 40 is provided by the lever arms 82n and 84n of the lever members 82 and 84 and the position of the block 85 interconnecting the lever arms. Since the block 85 is spaced a substantial distance from the pivot axis of the actuator 81 formed by the pin 97, in substantially all operating positions of the holddown mechanism 40, the actuator 81 is biased to rotate in a counterclockwise direction, viewing FIG. 3, about the pivot pin 97 formed by the bolt and nut assembly 96 to urge the lock member 76 into engagement with the bar 44.

The actuator 81 may be operated, at will, by a suitable lanyard 113 which may be trained from a point of connection to the actuator 81 at lever arm 82k as shown on FIG. 3 and indicated by numeral 115. Lanyard 113 may be trained to a suitable position on the dock 20 for actuation by dock personnel to effect pivotal movement of the actuator 81 in a clockwise direction, viewing FIG. 3, to effect release of forcible engagement between the lock member 76 and the bar 44.

The construction and operation of the dock leveler 10 and the holddown mechanism 40 is believed to be within the purview of one of ordinary skill in the art based on the foregoing description. The holddown mechanism 40 may be constructed using conventional engineering materials and methods known to those of skill in the art in dock leveler equipment and the like.

Although a preferred embodiment of the invention has been described in detail herein, those skilled in the art will also recognize that various substitutions and modifications may be made to the invention without departing from the scope and spirit of the appended claims.

What is claimed is:

1. In combination with a dock leveler including a frame and a ramp operable for movement between a stored position and a position operable for engagement with a vehicle loadbed, a self releasing holddown mechanism operable for normally holding said ramp against movement out of engagement with said loadbed but releasable under a predetermined force acting on said ramp, said holddown mechanism comprising:

an elongated bar member including a substantially continuous planar surface formed thereon and extending along a portion of the length of said bar member, said bar member being connected at one end to said ramp for movement with said ramp;

a body disposed for limited movement with said ramp in response to a force exerted on said ramp, said body including a surface thereon inclined at an acute angle with respect to said surface on said bar member;

a lock member supported on said body and moveable with respect to said body and said bar member in one direction to permit movement of said bar member relative to said body, said lock member being operable to be urged to move in an opposite direction to be forcibly wedged between said surfaces on said bar member and said body to prevent movement of said bar member relative to said body, in an opposite direction;

a release actuator supported on said body and engageable with said lock member for urging said lock member into wedged forcible engagement with said surfaces on said body and said bar member, respectively;

an anchor member connected to said frame and disposed adjacent said body; and a release member connected to said anchor member and operable to engage said release actuator in response to limited movement of said body with respect to said anchor member to effect release of said bar member for movement relative to said body by causing movement of said lock member out of forcible engagement with said surfaces on said bar member and said body, respectively.

2. The combination set forth in claim 1 wherein:

said lock member comprises a roller member mounted on said body for limited movement thereon.

3. The combination set forth in claim 1 wherein:

said lock member is connected to said release actuator for movement therewith in response to engagement of said release actuator by said release member.

4. The combination set forth in claim 3 wherein:

said release actuator comprises a release lever mounted on said body for pivotal movement relative thereto and for urging said lock member toward engagement with said surfaces on said bar member and said body, respectively.

5. The combination set forth in claim 1 wherein:

said anchor member comprises an elongated rod and said release member comprises a release plate mounted on said rod and secured to said rod by a nut axially adjustable on said rod for adjusting the force at which the release actuator is actuated to effect release of said bar member and said ramp.

6. The combination set forth in claim 1 wherein:

said release actuator includes a lever pivotally mounted on said body and a weight connected to said lever for urging said lever to move under gravitational forces acting thereon to urge such lock member into wedged engagement with and between said surfaces on said bar member and said body, respectively.

7. The combination set forth in claim 1 wherein:

at least one of a surface on said lock member and said surface on said bar member is knurled to enhance frictional engagement between said lock member and said bar member.

8. The combination set forth in claim 1 including:

adjustable stop members mounted on said release member and operable to adjust the position of said release member relative to said release actuator at which said release actuator is operated to move said lock member out of forcible engagement with said surface on said bar member.

9. In combination with a dock leveler including a frame and a ramp operable for movement between a stored position and a position for engagement with a loadbed of a vehicle, a self releasing holddown mechanism operable to hold said ramp against movement out of engagement with said loadbed but releasable under a predetermined force acting on said ramp, said holddown mechanism comprising:

an elongated, generally rectangular cross-section bar member connected at one end to said ramp for movement with said ramp, said bar member including a continuous generally flat surface extending along a part of the longitudinal extent of said bar member;

a body disposed for limited movement with said ramp in response to a force exerted on said ramp, said body comprising an elongated tubular body part and a guide part engageable with said bar member for guiding movement of said bar member relative to said body, said body further comprising spaced apart support members for a lock member, said support members including respective slots formed therein for receiving a support pin disposed in respective ones of said slots;

a roller lock member supported on said support pin and moveable relative to said body into and out of forcible engagement with said surface on said bar member;

a cam member on said body including a sloping surface thereon for engagement with said roller for urging said roller into forcible wedged engagement with and between said surface of said bar member and said sloping surface on said cam member, respectively;

a release actuator including at least one lever member mounted for pivotal movement on said body and operably connected to said roller for urging said roller into and out of forcible engagement with said cam member and said bar member;

an anchor member adapted to be connected to said frame, said anchor member comprising an elongated rod and a release member mounted on said rod;

a spring operably engaged with said body and resisting movement of said body and said bar member relative to said anchor member; and said release member is disposed for engagement with said lever member to effect pivotal movement of said lever member in a direction to effect release of said roller from forcible engagement with said bar member in response to a predetermined force acting on said ramp and said bar member.

10. The combination set forth in claim 9 including:

at least one adjustable stop mounted on one of said anchor member and said release member for adjusting the position of said body relative to said anchor member at which said lever member is actuated to effect release of said roller from forcible engagement of said bar member.

11. The combination set forth in claim 9 wherein:

said release actuator includes spaced apart lever members interconnected by a pivot pin and supported for pivotal movement with respect to said body to forcibly engage said roller with said bar member and to effect movement of said roller out of forcible engagement with said bar member.

12. In combination with a dock leveler including a frame and a ramp operable for movement between a stored position and a position operable for engagement with a vehicle loadbed, a self releasing holddown mechanism operable for normally holding said ramp against movement out of engagement with said roadbed but releasable under a predetermined force acting on said ramp, said holddown mechanism comprising:

an elongated bar member including a substantially planar surface formed thereon and extending along at least a portion of the length of said bar member, said bar member being connected to said ramp for movement with said ramp;

a body disposed for limited movement in response to a force exerted on said ramp, said body including a surface thereon inclined at an acute angle with respect to said surface on said bar member, and spaced apart slots formed in said body extending generally parallel to said surface on said body;

a lock member supported and guided for movement on said body and moveable with respect to said body and said bar member in one direction to permit movement of said bar member relative to said body, said lock member being operable to be urged to move in an opposite direction to be forcibly wedged between said surfaces on said bar member and said body to prevent movement of said bar member relative to said body in an opposite direction;

a release actuator supported on said body and engageable with said lock member for urging said lock member into wedged forcible engagement with said surfaces on said body and said bar member, respectively;

an anchor member connected to said frame and disposed adjacent said body; and a release member connected to said anchor member and operable to engage said release actuator in response to limited movement of said body with respect to said anchor member to effect release of said bar member for movement relative to said body by causing movement of said lock member out of forcible engagement with said surfaces on said bar member and said body, respectively.

* * * * *